UNITED STATES PATENT OFFICE.

OTTO W. KEIL, OF NEW YORK, N. Y., ASSIGNOR OF ONE-HALF TO OSCAR C. STETS, OF WOODHAVEN, NEW YORK.

PROCESS OF MANUFACTURING TRANSPARENT SURFACES.

1,308,426.     Specification of Letters Patent.     Patented July 1, 1919.

No Drawing.     Application filed June 12, 1917. Serial No. 174,401.

*To all whom it may concern:*

Be it known that I, OTTO W. KEIL, a subject of the Emperor of Germany, residing at New York city, in the county of New York and State of New York, have invented new and useful Improvements in Processes of Manufacturing Transparent Surfaces, of which the following is a specification.

The present invention relates to the treatment of open-work materials, such for example as wire screening which may be of about 12 meshes to the square inch, although closer or finer material could be employed if desired.

The object is to produce a material which will be semi-transparent, that is to say will allow some light to pass through the same, although ordinarily the product will not be sufficiently transparent to enable a person to look through the material. The product may be used as an interior decoration, an example being for imitation of stained glass in interior decoration, for example interior church windows and the like.

The wire screening or other similar base is first dipped or otherwise given a heavy coating, in a solution of sodium silicate, commonly known as "water glass." The solution is preferably at or near the saturation point, when applied to the base.

After dipping or otherwise coating the screening with the water glass, it is allowed to dry, and after drying, it will be found that the meshes of the gauze or screening are practically all filled up with a dried film of sodium silicate. The base, carrying the film of sodium silicate, substantially filling its meshes, is then coated with a suitable waterproof varnish, and for this purpose, varnishes containing celluloid as a base have been found to give good results, although I do not limit myself to the use of these particular varnishes, since for special purposes, other kinds of varnish may be preferable. After drying the varnish, the product is ready to be cut up into suitable sizes and shapes, for the particular use at hand.

In some instances it has been found advisable, where colored products are required, to apply a suitable dye or pigment, either to a portion of the surface, or to the entire surface. The fine pigment may be applied to the wet mass directly after applying the sodium silicate solution, or after drying the sodium silicate solution on the base, a suspension of the pigment in a suitable varnish or similar vehicle may be applied, either to the whole or a part of the surface, or at this stage a solution of a suitable dye, for example an alcohol or other suitable solvent may be painted or sprayed upon the dried base, or in some instances the dye to be employed may be dissolved in the sodium silicate solution or in the varnish, before applying to the base. In many instances it is preferable to apply a solution of dye in alcohol, alcohol-ether mixture, or similar solvent, to the product produced by drying the water glass solution on the base, and by thereafter coating the entire product with the varnish.

In some cases it is advisable to apply several coats of the water glass, and to dry after each application, and in this modification of the process, the dye may be dissolved in one or more of the solutions of water glass forming the successive coatings. In many cases also, it is advisable to apply several coats of varnish, one or more of which may carry the dye in solution.

The product possesses particular advantages over many of the products heretofore produced for use as substitutes for semi-transparent glass, in that it is non-inflammable and can be cheaply produced.

What I claim is:

1. A process of making a semi-transparent substitute for glass, which comprises applying to a relatively rigid foraminous base, a relatively heavy coat of concentrated water glass, allowing the same to dry, and thereafter applying a waterproof varnish, and allowing the same to dry.

2. The successive operations of (*a*) dipping wire screening into concentrated alkali metal silicate solution, (*b*) drying, (*c*) applying a solution of a dye to at least a portion of the surface, (*d*) drying, (*e*) applying a waterproof varnish and (*f*) drying, to produce a product resembling stained glass.

In testimony whereof I affix my signature.

OTTO W. KEIL.